US008747641B2

(12) United States Patent
Binder et al.

(10) Patent No.: US 8,747,641 B2
(45) Date of Patent: Jun. 10, 2014

(54) PARTIAL PIGMENTATION OF A COATING LAYER TO PREVENT INTERFERENCE ON ALUMINUM COMPONENTS OR COMPONENTS COMPRISING ALUMINUM

(75) Inventors: Hans Binder, Böhmenkirch (DE); Ottmar Binder, Böhmenkirch (DE)

(73) Assignee: Suddeutsche Aluminium Manufaktur GmbH, Bohmenkirch (DE)

( * ) Notice: Subject to any disclaimer, the term of this patent is extended or adjusted under 35 U.S.C. 154(b) by 0 days.

(21) Appl. No.: 12/075,558

(22) Filed: Mar. 12, 2008

(65) Prior Publication Data

US 2008/0311362 A1 Dec. 18, 2008

(30) Foreign Application Priority Data

Mar. 16, 2007 (DE) .......................... 10 2007 014 444
Feb. 27, 2008 (DE) .......................... 10 2008 011 298

(51) Int. Cl.
  *C25D 11/24* (2006.01)
(52) U.S. Cl.
  USPC ............ 205/172; 205/173; 205/324; 428/210
(58) Field of Classification Search
  USPC ................. 205/112, 172, 173, 324; 428/210
  See application file for complete search history.

(56) References Cited

U.S. PATENT DOCUMENTS

| | | | |
|---|---|---|---|
| 3,374,155 A | | 3/1968 | Weber |
| 3,502,563 A | * | 3/1970 | Schmidt ........................ 204/623 |
| 4,130,466 A | * | 12/1978 | Kramer ........................ 205/201 |
| 4,310,586 A | | 1/1982 | Sheasby et al. |
| 5,091,609 A | | 2/1992 | Sawada et al. |
| 5,904,989 A | | 5/1999 | Haenggi et al. |
| 5,952,140 A | * | 9/1999 | Visser et al. ................... 430/58.5 |
| 6,027,706 A | * | 2/2000 | Pinnavaia et al. ............. 423/600 |
| 6,258,158 B1 | * | 7/2001 | Bugnon et al. ................ 106/493 |
| 6,685,816 B1 | | 2/2004 | Brattinga et al. |
| 6,821,305 B2 | | 11/2004 | Yan |
| 6,884,336 B2 | | 4/2005 | Kia et al. |
| 8,377,561 B2 | | 2/2013 | Binder et al. |
| 2003/0111455 A1 | | 6/2003 | Krings et al. |
| 2003/0138661 A1 | * | 7/2003 | Souchard et al. ............. 428/689 |
| 2004/0004003 A1 | | 1/2004 | Hesse |
| 2004/0009344 A1 | * | 1/2004 | Krienke et al. ............... 428/328 |
| 2004/0233530 A1 | | 11/2004 | Kramer et al. |
| 2005/0013843 A1 | * | 1/2005 | Detty et al. ................... 424/426 |
| 2005/0129959 A1 | | 6/2005 | Roemer-Scheuermann et al. |
| 2006/0070881 A1 | | 4/2006 | Takada |

FOREIGN PATENT DOCUMENTS

| | | |
|---|---|---|
| AT | 365 245 | 12/1981 |
| BE | 664258 | 11/1965 |
| DE | 196 80 596 | 8/2001 |
| DE | 10027265 A1 | 12/2001 |
| EP | 0410003 A1 | 1/1991 |
| EP | 0802267 A1 | 10/1997 |
| EP | 1154289 A1 | 11/2001 |
| EP | 0 842 309 | 1/2002 |
| EP | 1457267 A1 | 9/2004 |
| EP | 1 407 935 B1 | 4/2006 |
| EP | 1642745 A2 | 4/2006 |
| EP | 1785748 A1 | 5/2007 |
| GB | 926418 A | 5/1963 |
| WO | 01/32965 A1 | 5/2001 |
| WO | 02/066727 A2 | 8/2002 |
| WO | 2004/063427 A1 | 7/2004 |

OTHER PUBLICATIONS

German Office Action for corresponding Application No. DE 10 2008 011 298.4-45 issued Jan. 11, 2010, with English Translation of the relevant wording.
First Official Action in counterpart Chinese Application No. 200810086480.2, dated Sep. 1, 2010, and English translation provided by foreign associate.
European Search Report for EP08004259 (parallel procedure in Europe), established Jan. 19, 2011.
Wang et al., Preparation and Characterization of Organic-Inorganic Hybrid Nanocomposites and Coatings, Journal of Functional Materials, vol. 35, pp. 2956-2958 (2004).
Wernick et al., The Surface Treatment and Finishing of Aluminum and its Alloys, ISBN: 0-904477-09-6, pp. 773-800, 824-829 (1987).

* cited by examiner

*Primary Examiner* — Susan D Leong
(74) *Attorney, Agent, or Firm* — Harness, Dickey & Pierce, P.L.C.

(57) ABSTRACT

A method for treating the surface of aluminum components or components comprising aluminum includes anodizing the surface. Anodizing includes introducing at least one pigmenting substance, particularly fully pigmenting substance, into depressions or pores open toward the surface of a comb or pore structure of the surface created by the anodizing process, and/or introducing oxidizable substances into depressions or pores open toward the surface of a comb or pore structure of the surface created by the anodizing process and oxidizing these substances. The method further includes applying a ceramic thin-film coating or siliceous sol-gel coating onto the surface. The ceramic thin-film coating or the sol-gel coating comprises a pigment particularly serving refraction purposes.

27 Claims, No Drawings

PARTIAL PIGMENTATION OF A COATING LAYER TO PREVENT INTERFERENCE ON ALUMINUM COMPONENTS OR COMPONENTS COMPRISING ALUMINUM

CROSS-REFERENCE TO RELATED APPLICATIONS

This application claims priority to German Patent Applications No. DE 10 2007 014 444.1, filed Mar. 16, 2007 and DE 10 2008 011 298.4, filed Feb. 27, 2008, which applications are herein expressly incorporated by reference.

FIELD

The present disclosure relates to an aluminum component or a component comprising aluminum, the surface thereof being treated, particularly provided with one or more coating layers.

BACKGROUND

The statements in this section merely provide background information related to the present disclosure and may not constitute prior art.

When treating the surfaces of components of this type, optical interference may occur, which creates the impression of an uneven, and consequently optically unappealing surface structure.

SUMMARY

It is therefore the object of the invention to create a method for treating the surfaces of aluminum components or components comprising aluminum, wherein the components despite surface treatment create an optically appealing, particularly interference-free impression by means of one or more coating layers.

This object is achieved according to the invention in that the surface of the aluminum component or the component comprising aluminum is first anodized. In this way, a comb or pore structure is created on the surface, the structure having depressions or pores that are open toward the outside. Subsequently, at least one pigmenting substance, particularly a fully pigmenting substance, is introduced into the depressions or pores. Alternatively or additionally, substances, particularly metal substances, are introduced into the depressions or pores, particularly by means of a deposition method in a bath, followed by an oxidation step of the substances, particularly by applying electric current. The substances are consequently adjusted in their color, wherein "colorless" is also possible. Thereafter, at least one coating layer is applied to the surface, particularly a ceramic thin-film coating or preferably a siliceous sol-gel coating, wherein the coating layer, particularly the ceramic thin-film coating or preferably the sol-gel coating, comprises a pigment, which serves refraction purposes. As a result, a coating is used, which is provided with such a pigment. By pigmenting the depressions or pores and/or coloring the same with the oxidized substances and by pigmenting the coating, no optical interference occurs so that a surface treated in this manner appears completely even.

DETAILED DESCRIPTION

The following description is merely exemplary in nature and is not intended to limit the present disclosure, application, or uses.

According to a further development of the invention, it is provided that the ceramic thin-film coating or the sol-gel coating is applied in a layer thickness of 0.5 μm to 5 μm. In this way, particularly good results can be achieved.

According to a further development of the invention, it is provided that an inorganic pigment is used as the pigment present in the sol-gel coating. The pigmenting substance to be introduced into the depressions or pores may comprise a pigment, which is likewise inorganic.

Furthermore, it is advantageous to configure the pore structure as a fine pore structure.

According to a further development of the invention, a pigmenting substance and/or a pigment having an arbitrary color, or each having an arbitrary color, particularly a transparent color is used. Accordingly, arbitrarily different, or also equivalent colors, particularly colorless pigments, can be used for the pigmenting substance and/or the pigment.

The invention further relates to a component made of aluminum or comprising aluminum, which is produced by the method according to the above description.

The invention relates to an aluminum component or a component comprising aluminum. The surface of the component is anodized, which is to say that an oxide layer is formed on the surface. This process is performed until a comb or pore structure forms on the surface of the components (viewed microscopically). The comb or pore structure is not closed, but is configured open toward the top. For coloring purposes, at least one pigmented substance can be introduced into the depressions of this comb or pore structure, particularly fine pore structure. Any arbitrary color, but also a transparent color, may be used as the pigment color. Alternatively or additionally, for coloring the depressions of this comb or pore structure, particularly fine pore structure, a color or a color spectrum can be adjusted on the surface by means of deposition methods and oxidation methods, particularly by means of electric current, depending on the deposition product used, particularly metal substances. Alternatively or in addition to a color design, a transparent color is also conceivable. Thereafter, a ceramic thin-layer coating or a siliceous sol-gel coating is applied onto the anodized surface, wherein the ceramic thin-layer coating or sol-gel coating is provided with a low volume percentage of 0.1 to 0.01 of a preferably inorganic pigment before or during the coating process. By adding this pigment, which may likewise be configured in any arbitrary color or may also be transparent, interference formation is prevented, which is to say the different layers on the component do not cause any optical interference effects. The ceramic thin-film coating or sol-gel coating is cured by the application of heat.

The layer thickness of the ceramic thin-film coating or siliceous sol-gel coating is preferably 0.5 μm to 5 μm.

Before applying the ceramic thin-film coating or sol-gel coating and/or before or after introducing the pigmented substance and/or the oxidizable substances into the pores for coloring purposes, optionally also a compacting step may be performed such that the pores in the upper region constrict, but do not close. The compacting step may in particular be performed by hydrating.

Further areas of applicability will become apparent from the description provided herein. It should be understood that the description and specific examples are intended for purposes of illustration only and are not intended to limit the scope of the present disclosure.

What is claimed is:

1. A method for treating a surface of aluminum components or components comprising aluminum, the method comprising:

anodizing the surface to create a pore structure on the surface;

compacting the pore structure of the surface to create compacted pores such that the compacted pores constrict but do not close;

introducing at least one substance into the compacted pores, the at least one substance including a first pigment; and applying a coating selected from a group including a ceramic thin-film coating and a siliceous sol-gel coating onto the surface, the coating including a second pigment.

2. The method according to claim 1, wherein the coating is applied in a layer thickness of 0.5 μm to 5 μm 3. The method according to claim 1, wherein the second pigment is an inorganic pigment.

4. The method according to claim 1, wherein at least one of the first and second pigments has a transparent color.

5. The method according to claim 1, wherein the step of compacting comprises hydrating.

6. A component made of aluminum or comprising aluminum produced by the method according to claim 1.

7. The method according to claim 1, wherein the first pigment and the second pigment have the same color.

8. The method according to claim 1, wherein the first pigment and the second pigment have a different color.

9. The method according to claim 1, wherein the second pigment of the coating is a volume percentage of 0.1 to 0.01 of the coating.

10. A method for treating a surface of aluminum components or components comprising aluminum, the method comprising:

defining an oxide layer on the surface by anodizing the surface to create a pore structure on the surface;

compacting the pore structure of the surface to create compacted pores such that the compacted pores constrict but do not close;

introducing at least one substance into the compacted pores, the at least one substance including a first pigment for coloring purposes; and applying a coating to define a coating layer, the coating selected from a group including a ceramic thin-film coating and a siliceous sol-gel coating onto the surface; and preventing optical interference between the oxide layer and the coating layer by including a second pigment in the coating.

11. The method according to claim 10, wherein the coating is applied in a layer thickness of 0.5 μm to 5 μm.

12. The method according to claim 10, wherein the second pigment is an inorganic pigment.

13. The method according to claim 10, wherein at least one of the first and second pigments has a transparent color.

14. The method according to claim 10, wherein the step of compacting comprises hydrating.

15. The method according to claim 10, wherein the first pigment and the second pigment have the same color.

16. The method according to claim 10, wherein the pigmenting substance and the pigment of the coating have a different color.

17. The method according to claim 10, wherein the second pigment of the coating determines a volume percentage of 0.1 to 0.01 of the coating.

18. A method for treating a surface of aluminum components or components comprising aluminum, the method comprising:

defining an oxide layer on the surface by anodizing the surface and creating pores;

compacting the pore structure of the surface to create compacted pores such that the compacted pores constrict but do not close;

introducing at least one substance into the depressions or pores of the oxide layer, the at least one substance including a first pigment for coloring purposes; and applying a coating to define a coating layer, the coating selected from a group including a ceramic thin-film coating and a siliceous sol-gel coating onto the surface; and preventing optical interference between the oxide layer and the coating layer by including a second pigment in the coating, the second pigment of the coating having a volume percentage of 0.1 to 0.01 of the coating.

19. The method according to claim 1, wherein the coating is a ceramic thin-film coating.

20. The method according to claim 1, wherein the coating is a silicon sol-gel coating.

21. The method according to claim 10, wherein the coating is a ceramic thin-film coating.

22. The method according to claim 10, wherein the coating is a silicon sol-gel coating.

23. The method according to claim 18, wherein the coating is a ceramic thin-film coating.

24. The method according to claim 18, wherein the coating is a silicon sol-gel coating.

25. The method according to claim 1, wherein the coating is the outermost layer applied to the surface.

26. The method according to claim 10, wherein the coating is the outermost layer applied to the surface.

27. The method according to claim 18, wherein the coating is the outermost layer applied to the surface.

* * * * *